United States Patent
Zhang et al.

(10) Patent No.: US 9,459,113 B2
(45) Date of Patent: Oct. 4, 2016

(54) VISUAL GUIDANCE FOR VEHICLE NAVIGATION SYSTEM

(75) Inventors: Wende Zhang, Shelby Township, MI (US); Varsha Sadekar, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2343 days.

(21) Appl. No.: 12/276,050

(22) Filed: Nov. 21, 2008

(65) Prior Publication Data

US 2010/0131197 A1    May 27, 2010

(51) Int. Cl.
*G01C 21/36*    (2006.01)

(52) U.S. Cl.
CPC ........... *G01C 21/36* (2013.01); *G01C 21/3647* (2013.01)

(58) Field of Classification Search
None
See application file for complete search history.

(56) References Cited

U.S. PATENT DOCUMENTS

| | | | | |
|---|---|---|---|---|
| 5,115,398 | A | * | 5/1992 | De Jong ........................ 701/200 |
| 5,806,018 | A | * | 9/1998 | Smith et al. ................... 701/211 |
| 6,314,364 | B1 | | 11/2001 | Nakamura |
| 6,604,049 | B2 | | 8/2003 | Yokota |
| 7,227,453 | B2 | * | 6/2007 | Arunkumar .............. 340/426.16 |
| 8,103,442 | B2 | * | 1/2012 | Akita et al. .................... 701/457 |
| 2009/0125234 | A1 | * | 5/2009 | Geelen et al. ................. 701/209 |

* cited by examiner

*Primary Examiner* — Michelle L Le
(74) *Attorney, Agent, or Firm* — John A. Miller; Miller IP Group, PLC

(57) ABSTRACT

A system and method that provide a video-based vehicle navigation system. The system positions an arrow on the video display that shows the specific turning direction for the vehicle for route guidance purposes. To determine the proper position of the guidance arrow, the process determines a distance from the current vehicle position to the location where the vehicle needs to turn using any suitable information, such as GPS position, range measurements and map information. The process then positions the guidance arrow on the ground at the turning location in world coordinates, and projects the guidance arrow onto the image. The camera can be calibrated to the ground using various techniques, such as an online automatic calibration process that uses detected objects in the scene around the vehicle.

17 Claims, 3 Drawing Sheets

VISUAL GUIDANCE FOR VEHICLE NAVIGATION SYSTEM

BACKGROUND OF THE INVENTION

1. Field of the Invention

This invention relates generally to a system and method for providing a visual display identifying a vehicle turning direction and, more particularly, to a system and method for providing an arrow superimposed on a camera based visual display that shows a turning direction for a vehicle in association with route guidance for a vehicle navigation system.

2. Discussion of the Related Art

Navigation systems for vehicles are well known in the art. Navigation systems typically allow a vehicle driver to identify a desired destination, such as by providing a specific address. The navigation system will then use GPS information and map databases to calculate a route from the vehicle's current position to the destination along the roads available from the map database. As the vehicle is driven along the route to the destination, map graphics are displayed on a display screen in the vehicle along with an icon showing the current position of the vehicle from GPS information. As the vehicle travels along the route and various turns need to be made, arrows are typically displayed on the map and audio is typically provided telling the driver how far to a particular turn and in what direction to turn.

The above described navigation system is generally very helpful in allowing a driver to get to an unknown destination with limited stress. However, various circumstances and driving conditions, even when using a navigation system, still make various turning decisions difficult. For example, night time driving and/or inclement weather conditions may provide poor visibility and prevent the driver from accurately seeing a turn and the direction of the turn even when aided by the graphics display and the audio assist. Further, many intersections include multiple travel lanes and/or multiple turning directions that the driver can follow, which may be confusing. Further, street markers may not adequately identify a street at an intersection. Also, following behind an obstacle, such as a large truck, may block the driver's view at an intersection. Therefore, current navigation systems may not be fully adequate.

SUMMARY OF THE INVENTION

In accordance with the teachings of the present invention, a system and method are disclosed that provide a video-based vehicle navigation system. The system positions an arrow on the video display that shows the specific turning direction for the vehicle for route guidance purposes. To determine the proper position of the guidance arrow, the process determines a distance from the current vehicle position to the location where the vehicle needs to turn using any suitable information, such as GPS position, range measurements and map information. The process then positions the guidance arrow on the ground at the turning location in world coordinates, and projects the guidance arrow onto the image. The camera can be calibrated to the ground using various techniques, such as an online automatic calibration process that uses detected objects in the scene around the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for overlaying a guidance arrow onto a video-based display in connection with a vehicle navigation system is merely exemplary in nature, and is in no way intended to limit the invention or its applications or uses.

As will be discussed below, the present invention proposes a vehicle navigation system that is enhanced by employing a camera that provides a video-based image of the road in front of the vehicle and a guidance arrow superimposed on the image showing which direction a vehicle driver should follow in response to following a particular navigation route. As will be discussed in detail below, the video image from the camera will be displayed on a display screen and be overlaid with the guidance arrow showing a direction of vehicle travel to follow a particular route. The question as to whether the video image will always be displayed during route navigation, or whether the display will be a combination of map graphics and video images, is a question that does not need to be answered for a proper understanding of the present invention.

Figure 1:
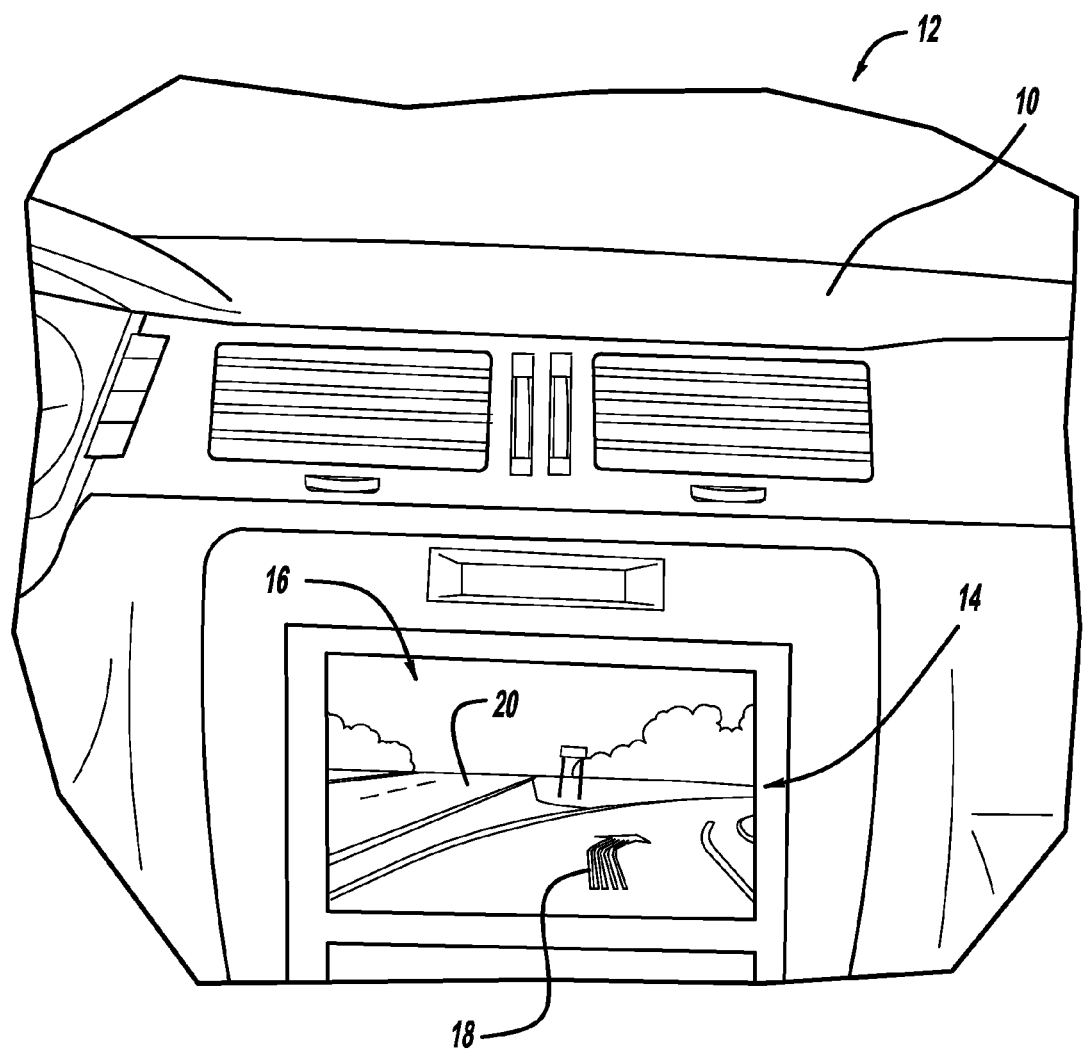
FIG. 1 is a cut-away perspective view of a vehicle navigation screen displaying a camera based video image and including a guidance arrow superimposed on the image showing a vehicle turning direction.

FIG. 1 is a cut-away, perspective view of a dash-board area 10 of a vehicle 12 including a display screen 14 associated with a vehicle navigation system. The display screen 14 is displaying a video image 16 from a camera (not shown) directed in front of the vehicle 12. A guidance arrow 18 is overlaid onto the image 16 and shows specifically the direction a vehicle driver should take to follow a particular route relative to the image 16 of the roadway 20 on the display screen 14. As the vehicle 12 moves, the image 16 is updated from the camera and the orientation and position of the guidance arrow 18 also changes so that it is specifically provided on the path that the vehicle 12 needs to take to negotiate the turn properly. Thus, limitations associated with known vehicle navigation systems for negotiating corners, confusing intersections and/or low visibility conditions can be reduced. In an alternate embodiment, instead of using the display screen 14, the guidance arrow 18 can be projected without video directly onto the windshield. Another camera can be provided inside the vehicle 12 to monitor the position of the driver's head so that the orientation and position of the arrow 18 can be changed relative to how the driver is viewing the windshield.

Although the arrow is being displayed on the video-based display image in the embodiments discussed above, in an alternate embodiment, a head-up display (HUD) can be employed where the video-based image is projected on the windshield of the vehicle and the arrow is overlaid on the windshield.

Figure 2:
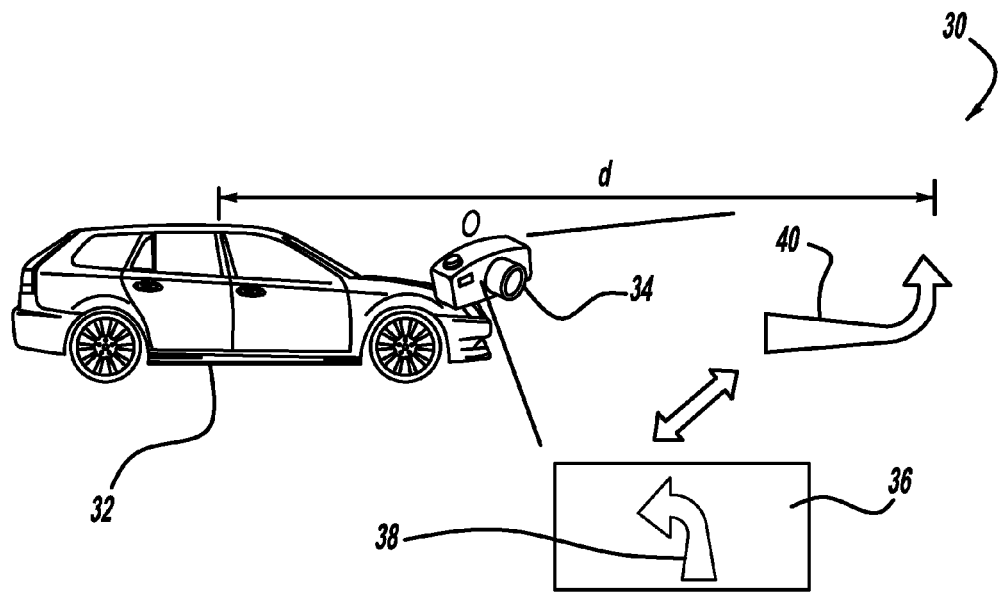
FIG. 2 is a plan view of a vehicle including a camera showing a process for determining the position of the guidance arrow.

FIG. 2 is a plan view of a system 30 showing how the guidance arrow 18 is properly and accurately overlaid onto the video image 16. The system 30 shows a vehicle 32 including a camera 34, where the camera 34 generates an image 36 including a guidance arrow 38, as discussed above. The camera 34 can be mounted at any location on the vehicle 32 suitable for the purposes described herein, such as behind a rearview mirror on the windshield of the vehicle 32. The process employs an algorithm to determine how the arrow 38 is positioned on the image 36 accurately so that the driver can specifically follow the arrow 38 to properly negotiate a turn. As the vehicle 32 moves, the distance to the turning location and the orientation of the turning location relative to the vehicle 32 changes so that the position, orientation and size of the arrow 38 also needs to continually change over time.

First, the algorithm determines the distance d from the current vehicle position to the location where the vehicle 32 will be turning. The algorithm can use any suitable process to make this determination with the information that is available, such as the vehicle's GPS position, range measurements to the turning location and navigation map information. The range measurements to the turning location can be provided in any suitable manner, such as by radar on the vehicle 32 or stereo cameras on the vehicle 32. The algorithm then positions a guidance arrow 40 on the ground at the turning location in world coordinates. The algorithm then projects or overlays the arrow 38 onto the two-dimensional video image 36 provided by the camera 34. The camera 34 needs to be calibrated relative to the ground, which can be done by any suitable technique, as described below.

As mentioned above, the camera 34 needs to be calibrated so that the arrow 38 to be properly positioned on the image 36. Acceptable techniques include, but are not limited to, an offline calibration process performed at the assembly plant using a checker board pattern or an online calibration process that automatically calibrates the camera 34 as the vehicle 32 is being driven. One technique for automatically calibrating the camera 34 as the vehicle 32 is driven based on ground feature points is described in U.S. patent application Ser. No. 12/125,471, titled, "Self Calibration of Extensor Camera Parameters for a Vehicle Camera," filed May 22, 2008, assigned to the assignee of this application and herein incorporated by reference.

The present invention proposes an online camera calibration process that employs range measurements and GPS information. For this embodiment, it is assumed that the vehicle 32 is equipped with radar, a stereo-camera and a GPS receiver. GPS positions of city infrastructure, such as stop signs, are stored in a map database on the vehicle 32. Vehicle-to-vehicle (V2V) communications and vehicle-to-vehicle infrastructure (V2I) communications can provide the GPS positions of vehicles and the GPS positions of infrastructure to the vehicle 32. Radar and the stereo-camera provide distances of objects to the vehicle 32. Additional GPS and range information can be employed to enhance the camera calibration of the vehicle 32 as follows.

Figure 3:
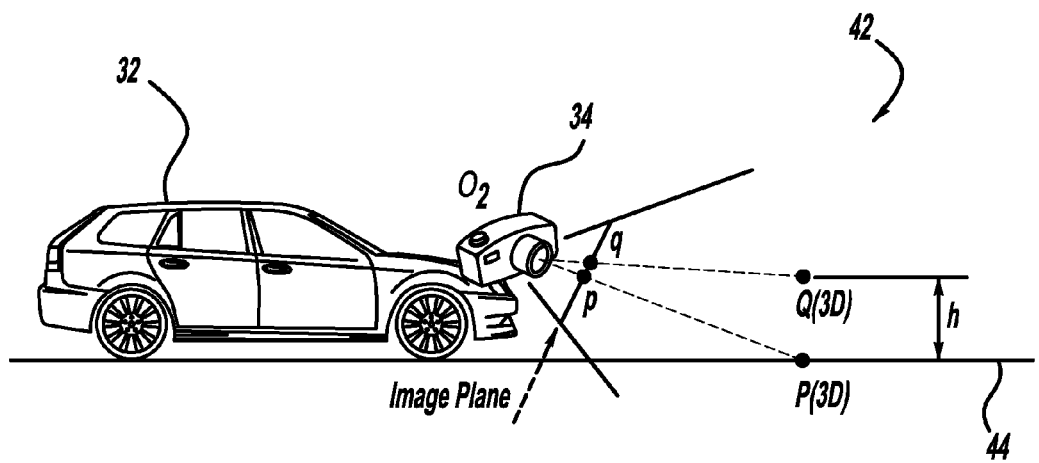
FIG. 3 is a plan view of a vehicle including a camera showing a technique for providing GPS-based camera calibration.

FIG. 3 shows a system 42 including the vehicle 32 traveling on a roadway 44 and including variables for camera calibration. The calibration algorithm first receives GPS messages that may include information identifying other vehicles, such as the license plate numbers of other vehicles. The algorithm detects and identifies objects in the video images 36 from the camera 34, such as the vehicle license plates and stop signs. The algorithm then associates two-dimensional image points with their three-dimensional positions based on object detection and recognition, which results in the two-dimensional image and their three-dimensional positions provided by GPS, radar and stereo-camera together with object models, such as the height h of the camera 34 off of the ground. The algorithm then calculates a camera rotation matrix R(t) and a translation vector t(t) using an additional camera projective equation constraint as:

$$p(t)=[R(t)t(t)]P(t)$$

Where p(t) is the two-dimensional image point and P(t) is the corresponding three-dimensional position.

Figure 4:
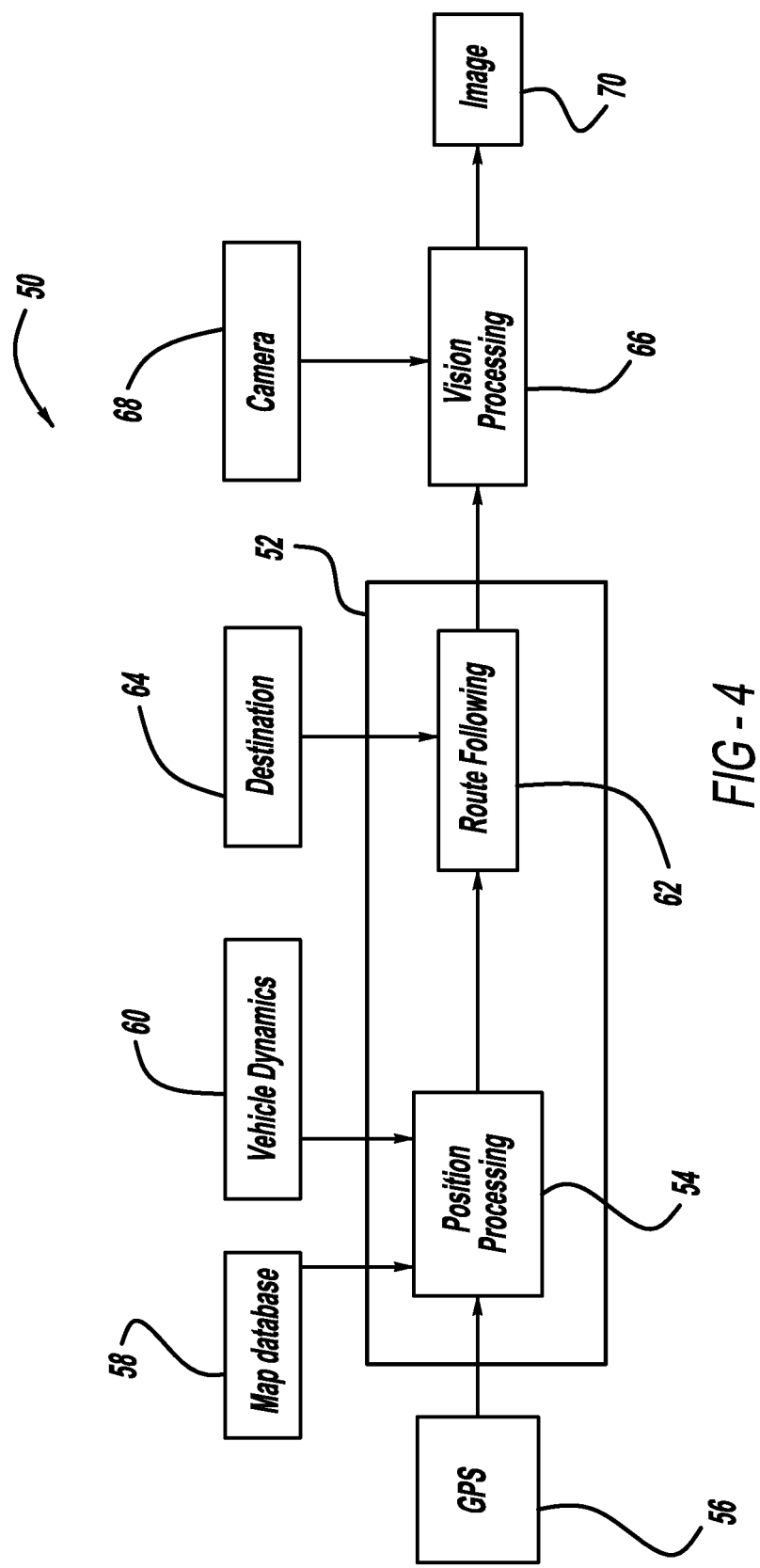
FIG. 4 is a schematic block diagram of a system for positioning a guidance arrow on a video-based display in connection with a vehicle navigation system.

FIG. 4 is a block diagram of a system 50 showing the elements employed for the enhanced vehicle navigation system using a guidance arrow as discussed above. The system 50 includes a navigation unit 52 having a positioning processor 54. The positioning processor 54 determines the position of obstacles around the vehicle relative to the vehicle's position and the map information, as discussed above. The positioning processor 54 receives GPS signals from a GPS receiver 56, map data information from a map database 58 and vehicle dynamics information from a vehicle dynamics block 60 concerning the motion of the vehicle. The position information is provided to a route following processor 62 in the navigation unit 52 that determines whether the information will be used to make a vehicle turn. The route following processor 62 receives destination information from a destination block 64. When a turn is coming, the route following processor 62 sends the necessary information to a vision processor 66 that receives the camera signals from a camera 68. The vision processor 66 processes the information to generate an image 70 including the guidance arrow based on the discussion above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for identifying a turn for a vehicle in association with a vehicle navigation system, said method comprising:

determining a vehicle route having a vehicle destination;
providing a video image using a camera of a scene in front of the vehicle as the vehicle is traveling along the route;
automatically calibrating the camera using the video image from the camera so that the orientation of the video image relative to the ground is known;
taking range measurements with vehicle mounted equipment that measures the distance from the vehicle to objects;
determining a distance from a current vehicle position to a turning location along the route, where the determination includes using the range measurements; and
projecting a guidance arrow onto the video image that identifies where the driver should turn the vehicle at the turning location to follow the route, wherein projecting the guidance arrow onto the display includes first placing a virtual guidance arrow laying flat on the ground at the turning location in world coordinates.

2. The method according to claim 1 wherein determining the distance from the vehicle position to the turning location includes using a vehicle GPS position and navigation map information.

3. The method according to claim 1 wherein determining the range measurements includes using vehicle radar.

4. The method according to claim 1 wherein calibrating the camera includes using an offline calibration process.

5. The method according to claim 1 wherein calibrating the camera includes automatically calibrating the camera using an online calibration process.

6. The method according to claim 5 wherein calibrating the camera includes employing range measurements and GPS information to determine infrastructure and distances to objects in the image, associating two-dimensional image points with their three-dimensional positions based on object detection and determining a camera rotation matrix and a translation vector using a two-dimensional image point and a corresponding three-dimensional position.

7. The method according to claim 6 wherein calibrating the camera includes using GPS messages that include information identifying other vehicles including the license plate numbers of other vehicles.

8. The method according to claim 6 wherein calibrating the camera includes using vehicle-to-vehicle communications and vehicle-to-infrastructure communications.

9. The method according to claim 1 wherein providing a video image of a scene includes using a display screen in the vehicle.

10. The method according to claim 1 wherein providing a video image of a scene includes using a display screen on a windshield of the vehicle.

11. The method according to claim 1 wherein determining the range measurements uses a stereo-camera.

12. A method for identifying a turn for a vehicle in association with a vehicle navigation system, said method comprising:
  determining a vehicle route having a vehicle destination;
  providing a video image from a camera of a scene in front of the vehicle as the vehicle is traveling along the route;
  automatically calibrating the camera using an online camera calibration process that uses the video image from the camera so that the orientation of the camera relative to the ground is known; and
  projecting a guidance arrow onto the windshield that identifies where the driver should turn the vehicle at a turning location to follow the route, wherein projecting a guidance arrow onto the windshield includes determining a distance from a current vehicle position to the turning location using a vehicle GPS position, range measurements and/or navigation map information, wherein projecting the guidance arrow onto the windshield includes first placing a virtual guidance arrow laying flat on the ground at the turning location in world coordinates, and another camera inside the vehicle to monitor the position of the driver's head so that the orientation and position of the arrow can be changed relative to how the driver is viewing the windshield.

13. The method according to claim 12 wherein determining the range measurements includes using vehicle radar and/or a stereo-camera.

14. The method according to claim 12 wherein calibrating the camera includes employing range measurements and GPS information to determine infrastructure and distances to objects in the image, associating two-dimensional image points with their three-dimensional positions based on object detection and determining a camera rotation matrix and a translation vector using a two-dimensional image point and a corresponding three-dimensional position.

15. A system for identifying a turn for a vehicle in association with a vehicle navigation system, said system comprising:
  means for determining a vehicle route having a vehicle destination;
  means for providing from a camera a video image of a scene in front of the vehicle as the vehicle is traveling along the route;
  means for determining a distance from a current vehicle position to a turning location along the route;
  means for automatically calibrating the camera to the ground using the video image from the camera; and
  means for projecting a guidance arrow onto the video image that identifies where the driver should turn the vehicle at the turning location to follow the route, wherein projecting the guidance arrow onto the display includes first placing a virtual guidance arrow laying flat on the ground at the turning location in world coordinates.

16. The system according to claim 15 further comprising means for automatically calibrating the camera using an online calibration process, said means for calibrating the camera employing range measurements and GPS information to determine infrastructure and distances to objects in the image, associating two-dimensional image points with their three-dimensional positions based on object detection and determining a camera rotation matrix and a translation vector using a two-dimensional image point and a corresponding three-dimensional position.

17. The system according to claim 15 wherein the means for determining a distance from a current vehicle position to a turning location along the route uses a vehicle GPS position, range measurements and navigation map information.

* * * * *